(12) United States Patent
Church et al.

(10) Patent No.: US 7,542,224 B2
(45) Date of Patent: Jun. 2, 2009

(54) ADAPTIVE CONTROL OF HEAD VELOCITY DURING DATA STORAGE DEVICE STARTUP

(75) Inventors: Robert Billings Church, Bolder, CO (US); Sumit Chandra, Longmont, CO (US); Rory Stephan Goodman, Boulder, CO (US); MuChong Lim, Singapore (SG); Serene Kiang Low, Singapore (SG); Ishak Sugeng Iskandar, Singapore (SG)

(73) Assignee: Seagate Technology, Scotts Valley, CA (US)

( * ) Notice: Subject to any disclaimer, the term of this patent is extended or adjusted under 35 U.S.C. 154(b) by 617 days.

(21) Appl. No.: 11/168,816

(22) Filed: Jun. 28, 2005

(65) Prior Publication Data

US 2006/0291086 A1 Dec. 28, 2006

(51) Int. Cl.
*G11B 21/02* (2006.01)

(52) U.S. Cl. .................................................. 360/75
(58) Field of Classification Search ............... None
See application file for complete search history.

(56) References Cited

U.S. PATENT DOCUMENTS

| | | | |
|---|---|---|---|
| 5,455,723 A * | 10/1995 | Boutaghou et al. ......... 360/75 |
| 5,475,545 A | 12/1995 | Hampshire et al. |
| 6,115,205 A | 9/2000 | Waugh et al. |
| 6,169,382 B1 | 1/2001 | McKenzie et al. |
| 6,222,696 B1 * | 4/2001 | Kim .......................... 360/75 |
| 6,233,110 B1 * | 5/2001 | Suzuki ................... 360/73.03 |
| 6,236,527 B1 * | 5/2001 | Uchiike et al. ............... 360/75 |
| 6,271,636 B1 | 8/2001 | Galloway |
| 6,449,117 B1 | 9/2002 | Waugh |
| 6,570,733 B1 | 5/2003 | Waugh et al. |
| 6,590,731 B1 * | 7/2003 | Pan et al. ...................... 360/75 |
| 6,707,634 B2 | 3/2004 | Kagami et al. |
| 6,714,377 B2 * | 3/2004 | Bement et al. ............... 360/75 |
| 6,744,590 B2 | 6/2004 | Chu et al. |
| 6,876,510 B2 * | 4/2005 | Heydt et al. .................. 360/75 |
| 2002/0067562 A1 | 6/2002 | Kagami et al. |
| 2004/0179288 A1 | 9/2004 | Kagami et al. |

* cited by examiner

*Primary Examiner*—K. Wong
(74) *Attorney, Agent, or Firm*—Derek J. Berger

(57) ABSTRACT

A control method is provided for loading a data transfer head to a data storage medium comprising: determining a desired maximum displacement between a parked position of the head and an encroaching position of the head in relation to a selected data storage track of the medium; determining a spin interval associated with a predetermined quantity of medium movement before the head reaches the encroaching position; rotating the data storage medium at a beginning of the spin interval; and moving the actuator during the spin interval from the parked position and at a velocity resulting in the head being displaced at the end of the spin interval a distance that is less than the maximum displacement. A data storage device is contemplated comprising programmed instructions for performing this method for a predetermined number of loading occurrences, or in relation to observing a threshold data transfer error rate.

19 Claims, 3 Drawing Sheets

ADAPTIVE CONTROL OF HEAD VELOCITY DURING DATA STORAGE DEVICE STARTUP

FIELD OF THE INVENTION

The claimed invention relates generally to the field of data storage devices and more particularly but without limitation to dispersing contamination that exists in the data storage device.

BACKGROUND

Contamination in a data storage device can adhere to a head and create unstable flight characteristics, and can become interposed between the head and the medium causing damage to either or both. Although great care is taken to minimize the possibility that contamination exists, nevertheless in today's ever-smaller and higher performance devices it is a factor of serious concern.

Contact-start-stop type devices benefited from wiping the head with the rotating medium before flying the head adjacent the data storage area. The demand for increased storage capacity in ever-smaller packages has resulted in more usage of head loading and unloading devices, which are intended to prevent such contact between the head and medium. In some solutions control schemes are invoked whereby the head is made to intentionally contact the medium. It has been observed, however, that such contact can create new contamination, and is thus problematic in efforts at reducing it. What is needed is a solution that deterministically uses the motions of the head and medium in conjunction with the windage created by the spinning medium to disperse existing contamination to a downstream filter. It is to these improvement features that the embodiments of the present invention are directed.

SUMMARY OF THE INVENTION

Embodiments of the present invention are generally directed to contamination and debris control in a data storage device.

In some embodiments a method is provided for loading a data transfer head to a data storage medium comprising: determining a desired maximum displacement between a parked position of the head and an encroaching position of the head in relation to a selected data storage track of the medium; determining a spin interval associated with a predetermined quantity of medium movement before the head reaches the encroaching position; rotating the data storage medium at a beginning of the spin interval; and moving the actuator during the spin interval from the parked position and at a velocity resulting in the head being displaced at the end of the spin interval a distance that is less than the maximum displacement. A data storage device is contemplated comprising programmed instructions for performing this method for a predetermined number of loading occurrences, or in relation to observing a threshold data transfer error rate.

In some embodiments a servo controller apparatus is configured for controlling a velocity for moving the head during the loading sequence in relation to a first input defining the maximum displacement during the loading sequence for the head from the parked position, and in relation to a second input defining the predetermined quantity of data storage medium rotation prior to the head being displaced a distance equal to the maximum displacement.

In some embodiments a data storage device is provided comprising a head in a data storing and retrieving relationship with a storage medium, and means for loading the head to the medium to reduce the adverse effects of debris being operably disposed between the head and the medium.

These and various other features and advantages which characterize the claimed invention will become apparent upon reading the following detailed description and upon reviewing the associated drawings.

DETAILED DESCRIPTION

Figure 1:
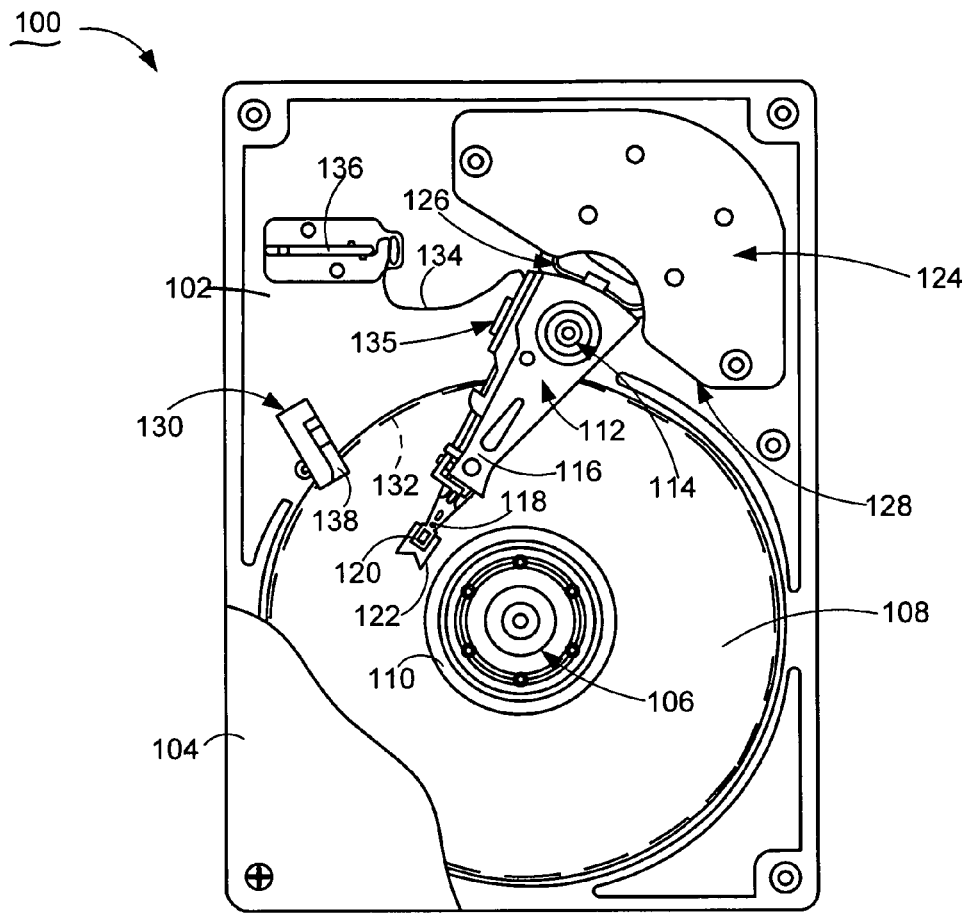
FIG. 1 is a plan view of a data storage device that is constructed in accordance with embodiments of the present invention.

Referring to the drawings in general, and more particularly to FIG. 1, shown therein is a plan view of a data storage device 100 that is constructed in accordance with embodiments of the present invention. The device 100 includes a base 102 and a cover 104 (partially cutaway), which together provide a sealed housing for a number of components. The components include a spindle motor 106 to which one or more data storage mediums 108 are mounted and secured by a clamp ring 110. Adjacent the mediums 108 is an actuator assembly 112 which pivots around a bearing assembly 114. The actuator assembly 112 includes actuator arms 116 that support load arm assemblies 118. The load arm assemblies 118 in turn support read/write heads 120 and lift tabs 122, with each of the heads 120 corresponding to a surface of one of the mediums 108. Each of the mediums 108 has a data recording surface divided into data tracks, and the heads 120 are positioned adjacent data tracks to retrieve data from, or store data to, the tracks.

The actuator assembly 112 is positioned by way of a voice coil motor (VCM) 124, comprising an actuator coil 126 immersed in the magnetic field generated by permanent magnets 128. A magnetically permeable flux path (such as a steel plate) is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the permanent magnets 128 in accordance with the well-known Lorentz relationship. As the actuator coil 126 moves, the actuator assembly 112 pivots around the pivot shaft bearing assembly 114 causing the head 120 to be moved radially across the medium 108.

To provide the requisite electrical conduction paths between the heads 120 and data storage device 100 control circuitry, head wires are routed on the actuator assembly 112 from the heads 120, along the load arm assemblies 118 and the actuator arms 116, to a flex circuit 134. The head wires are secured to corresponding pads of a printed circuit board (PCB) 135 of the flex circuit 134. In turn, the flex circuit assembly 134 is connected to a flex circuit bracket 136, which in turn is connected through the base 102 to a data storage device PCB (not shown) which can be mounted to the underside of the base 102.

A ramp loading apparatus 130 is located in proximity to the outer perimeters of the mediums 108. At such time that the data storage device 100 is not in use, the heads 120 are moved to the ramp 130 and unloaded by a portion of the actuator assembly 112, such as the tab 122, slidingly engaging an inclined ramp surface 138.

Figure 2:
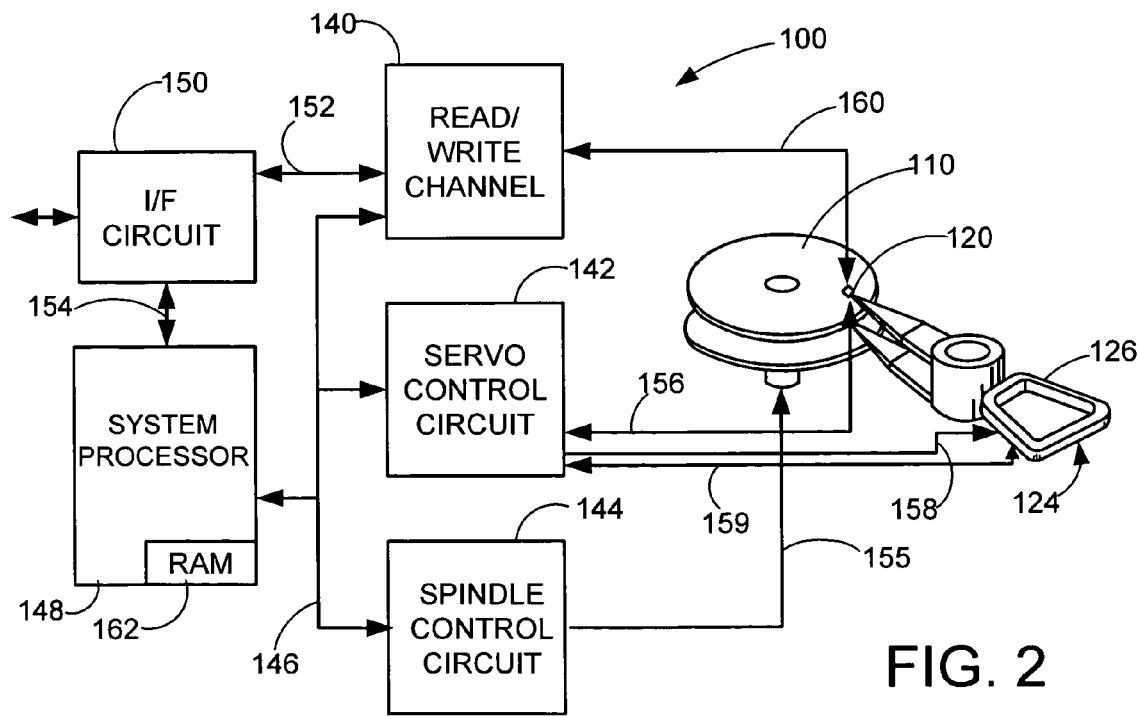
FIG. 2 is a functional block diagram of the data storage device of FIG. 1.

FIG. 2 is a functional block diagram of the data storage device 100 generally comprising a read/write channel 140, a servo control circuit 142, and a spindle control circuit 144, all connected by a control bus 146 to a system controller 148. An interface circuit 150 is connected to the read/write channel 140 by bus 152 and to the system controller 148 by bus 154. The interface circuit 150 serves as a communications interface between the data storage device 100 and a host or network server.

The spindle control circuit 144 controls the rotational speed of the motor 106, and thus the medium 108, by signal path 155. The servo control circuit 142 receives servo position information from the head 120 by way of signal path 156 and, in response thereto, provides a correction signal by way of signal path 158 to an actuator coil portion of the VCM 124 in order to position the heads 120 with respect to the medium 108. As the coil 126 moves a back electromagnetic force (BEMF) is communicated by way of signal path 159 that is proportional to the velocity with which the coil 126 is moving. The read/write channel 140 passes data to be stored and retrieved from the medium 108, respectively, by way of signal path 160 and the head 120.

Generally, in response to a write command from a host or other network server received by the system controller 148 from the interface 150, the controller 148 controls the flow of data to be written to the storage medium 108. The read/write channel 140, in turn, provides store and retrieve signals to the head 120 in order to store data to the medium 108 and retrieve data from the medium 108. The head 120 can, for example, provide an analog read signal to the read/write channel 140, which in turn converts the analog read signal to digital form and performs the necessary decoding operations to provide data to the interface circuit 150 for output to the host. In controlling these operations of the data storage device 100, the system controller 148 employs the use of programming instructions stored in memory 162.

The servo control 142 is configured for controlling the velocity of the head 120 during a loading sequence. Particularly, the servo control 142 is capable of implementing a reduced-velocity, $V_{red}$, sequence in order to reduce the adverse affects of contamination possibly existing in the space where the head 120 is loaded. As discussed further below, the reduced-velocity sequence might advantageously be invoked for a predetermined number of loading cycles from the time the data storage device 100 is manufactured, or the sequence might be invoked based on an observed contamination level in the data storage device.

Figure 3:
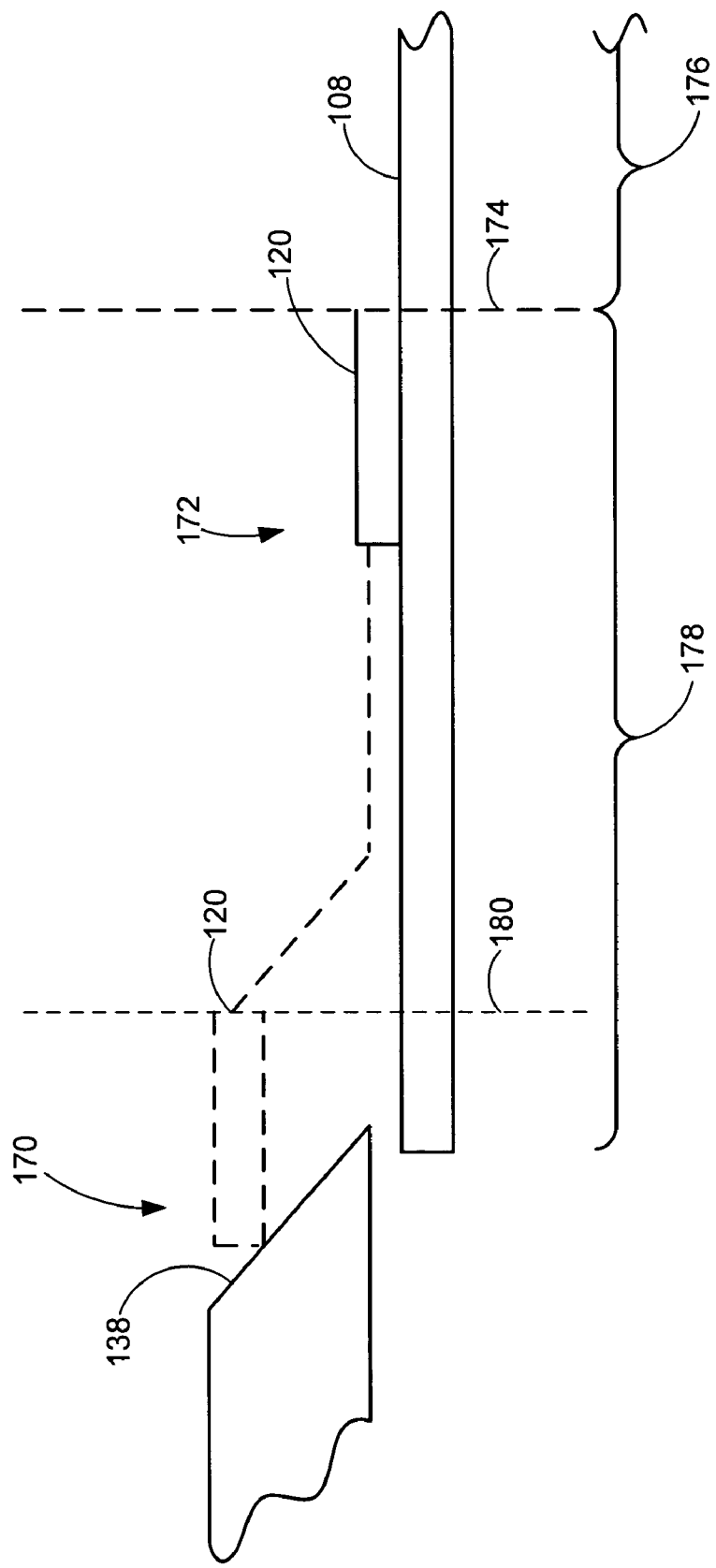
FIG. 3 is a diagrammatic view of the head being moved from the parked position at a reduced velocity during the spin interval.

FIG. 3 is a diagrammatic view showing the head 120 previously being in a parked position 170 and subsequently moved to the right to a position 172 that is immediately adjacent to where it encroaches an outermost data storage track 174 of a data storage area 176 defined by a plurality of additional data storage tracks. An outer diameter guardband 178 can comprise a plurality of servo tracks, with an outermost servo track 180.

When the data storage device 100 is started, preferably the motor 106 is energized immediately in order to start the medium 108 rotating. For optimal data throughput performance the head 120 is loaded immediately after the time that the medium 108 is moving at a sufficient speed to produce the fluid bearing supporting the head 120. The head 120 is then moved at a high speed to the data storage area 176.

It has been observed during reduction to practice, however, that spinning the medium 108 is an effective way of removing contamination that can reside on the medium 108 and the head 120. Contamination can be left from the manufacturing process, or can be introduced into the enclosure during normal operation such as by being operated in a harsh environment, or from an event within the enclosure such as outgassing or condensation. In any event, defining a predetermined quantity of medium rotation prior to permitting the head 120 to travel adjacent the data storage area 176 has been observed to reduce the number of data storage errors, such as erasures of the data storage area 176, that can otherwise be caused by contamination.

One solution is to increase the size of the outer diameter guardband 178, but this reduces the available data storage capacity of the medium 108. Other solutions can involve mechanical constraints acting on the actuator 112 so as to positively limit its travel for a predetermined time. The embodiments herein contemplate a control scheme that can exist in the form of code executed by the servo control circuit 142 so as to selectively move the head 120 at a relatively reduced velocity, $V_{red}$, to reduce the adverse affects of contamination that might be present in the enclosure.

The servo control circuit 142 determines an appropriate reduced velocity in relation to a desired quantity of medium 108 rotation, sometimes referred to as the "spin interval," prior to the head 120 being moved adjacent the data storage area 176. This quantity can be preset by the designer, and can be incremented for varying observed levels of contamination. This desired quantity of medium 108 rotation can be determined either in spin time or number of rotations. The servo control circuit 142 also determines $V_{red}$ in relation to a desired maximum displacement of the head 120 from the parked position 170 during the spin interval. Although the velocities applied may be positive or negative, so as to move the head 120 toward or away from the data storage area 174, preferably the velocity is selected so as to make the head 120 arrive immediately adjacent the outermost data storage track 174, but not yet encroaching thereon, at the expiration of the spin interval.

During the time the head 120 is supported on the ramp 138 it is controllably positioned by the control signal 158 in relation to the observed BEMF signal 159. Once the head 120 is loaded to the medium 108, position control can be provided by reading the servo data by signal 156. The servo control circuit 142 can invoke the reduced velocity scheme of the embodiments herein throughout the spin interval by limiting a current to the coil 126 in relation to the observed BEMF 159. In so doing the servo control circuit 142 can verify positional error by reading the servo data. Otherwise, the servo control circuit 142 can switch from BEMF control to a servo control seek profile routine after the head 120 is loaded and still within the outer diameter guardband 178.

It has been observed that contamination dispersal is improved by motion of the head 120 relative to the medium 108, and so preferably the $V_{red}$ is characterized as a continuous nonzero velocity. If possible, preferably the $V_{red}$ is further characterized as a continuous positive velocity; that is, the velocity continuously moves the head 120 toward the data storage area 176. However, dithering the head 120 in opposing directions can be effective at removing contamination from the head 120. The dithering can be performed while the head 120 is supported by the ramp surface 138, or while the head is flying over the outer diameter guardband 178. It can also be advantageous to provide a mechanical positive stop, such as an actuator latch mechanism, to which the supporting structure for the head 120 can be temporarily impeded from further motion until the spin interval expires.

In the case of a newly manufactured data storage device 100, it can be advantageous to set a counter that tracks the number of head 120 load sequences that have occurred. Based on the prediction that a threshold number of load sequences sufficiently disperses any contamination, the control scheme can then switch to the maximum velocity, $V_{max}$, in moving the head 120 during loading. In other embodiments the servo control circuit 142 can be triggered to implement the $V_{red}$ on the basis of an observance of a threshold level of data reading errors.

Figure 4:
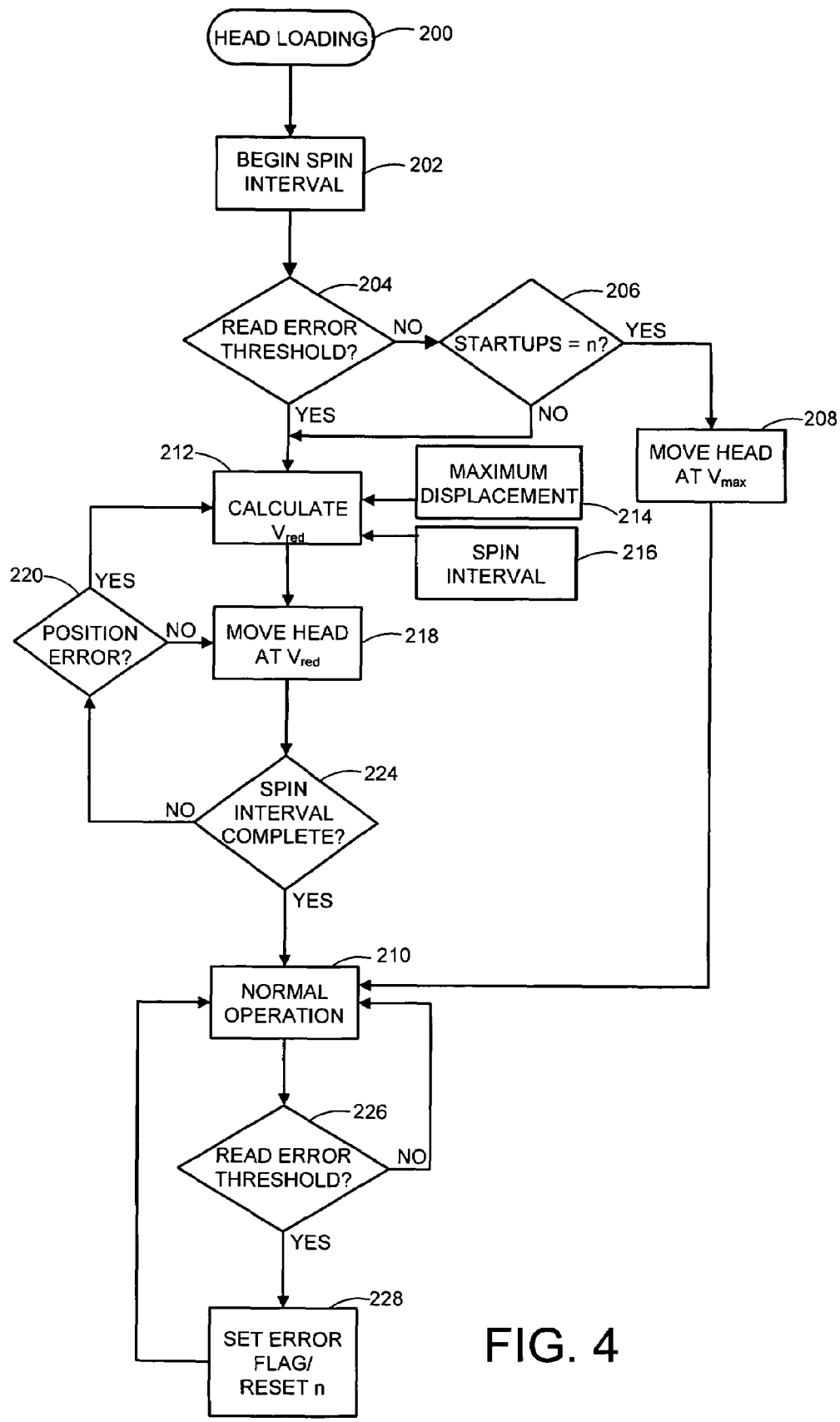
FIG. 4 is a flow chart illustrating steps for practicing a method of head loading in accordance with embodiments of the present invention.

FIG. 4 is a flowchart of steps performed by the servo control 142 in a method 200 for head loading. The method 200 begins in block 202 with a call for powering up the data storage device 100, wherein the medium 108 begins spinning immediately to maximize the spin interval. In block 204 it is determined whether the predetermined threshold level of data read errors has been met, thereby predicting a contaminated environment exists. If the determination of block 204 is no, then in block 206 it is determined whether the predetermined number of startups has occurred. If the determination of block 206 is yes, then control passes to block 208 and normal operations proceed at block 210 with the head 120 controlled at $V_{max}$.

If, however, the determination of block 204 is yes or the determination of block 206 is no, then control passes to block 212 where the $V_{red}$ is calculated from a predetermined maximum displacement 214 and a predetermined spin interval 216. In equivalent alternative embodiments these input variables can be adaptively varied in the face of a predicted level of contamination, or they can be programmable by the user of the data storage device 100.

In block 218 the head 120 is moved at $V_{red}$. During the spin interval, position error can be determined in block 220 by reading the servo information in the outer diameter guardband 178. If too much error is observed then control is passed back to block 212 to recalculate $V_{red}$. When the spin interval is complete, as determined by block 224, control passes to block 210 and normal operations ensue. During normal operations, however, an observance of unexpected read error rates in block 226 can trigger setting the error threshold flag of block 204, and optionally reset the startups counter in block 206.

In summary, a method (such as 200) is provided for loading a data transfer head (such as 120) to a data storage medium (such as 108). The method comprises determining a desired maximum displacement between a parked position of the head and an encroaching position of the head in relation to a selected data storage track of the medium (such as 214); determining a spin interval associated with a predetermined quantity of medium movement before the head reaches the encroaching position (such as 216); rotating the data storage medium at a beginning of the spin interval (such as 202); and moving the head during the spin interval from the parked position and at a velocity resulting in the head being displaced at the end of the spin interval a distance that is less than the maximum displacement (such as 218).

The determining a spin interval step can be characterized by selecting an amount of time for rotating the medium, or by selecting a number of medium rotations. The moving step can be characterized by limiting a supply power to a voice coil motor in relation to an observed back electromotive force (BEMF) (such as 159), or by limiting a velocity in relation to a servo control seek profile (such as 158). Preferably, the moving step is characterized by a continuous positive non-zero velocity, displacing the head at the end of the spin interval a distance equal to the maximum displacement.

The determining the maximum displacement step can be characterized by selecting an outermost data storage track (such as 174) of the medium, or can be changed to a different data track if a larger effective outer diameter guardband (such as 178) is needed to effectively disperse the contamination. The reduced-velocity control can be implemented for a desired number of startups (such as 206) or as a result of observing a threshold level of data retrieval errors (such as 204).

In some embodiments a servo controller apparatus (such as 142) is configured for controlling the velocity for moving the head during the loading sequence in relation to a first input defining the maximum displacement during the loading sequence for the head from a parked position, and in relation to a second input defining the predetermined quantity of data storage medium rotation prior to the head being displaced a distance equal to the maximum displacement. The servo controller can be responsive to an observed data transfer error rate in invoking the reduced-velocity sequence (such as 226).

In some embodiments a data storage device is provided comprising a head in a data storing and retrieving relationship with a storage medium, and means for loading the head to the medium to reduce the adverse effects of contamination being operably disposed between the head and the medium. For purposes of this description and the appended claims, the term "means for loading" expressly contemplates controlling a velocity of the head during the spin interval in order to effectively disperse the contamination. The term "means for loading" does not contemplate other attempted solutions involving merely positional control of the head during the spin interval, such as in moving the head to one or more stationary positions during the spin interval.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A method for loading a data transfer head to a data storage medium comprising:
   determining a desired maximum displacement between a parked position of the head and an encroaching position of the head in relation to a selected data storage track of the medium;
   determining a spin interval associated with a predetermined quantity of medium movement before the head reaches the encroaching position;
   rotating the data storage medium at a beginning of the spin interval; and
   moving the head during the spin interval from the parked position and at a velocity resulting in the head being displaced at the end of the spin interval a distance that is less than the maximum displacement.

2. The method of claim 1 wherein the determining a spin interval step is characterized by selecting an amount of time for rotating the medium.

3. The method of claim 1 wherein the determining a spin interval step is characterized by selecting a number of medium rotations.

4. The method of claim 1 wherein the moving step is characterized by limiting a supply power to a voice coil motor in relation to an observed back electromotive force (BEMF).

5. The method of claim 4 wherein the moving step is characterized by limiting a velocity in relation to a servo control seek profile.

6. The method of claim 1 wherein the moving step is characterized by a continuous nonzero velocity.

7. The method of claim 6 wherein the moving step is characterized by a continuous positive velocity.

8. The method of claim 1 wherein the moving step is characterized by a velocity resulting in the head being displaced at the end of the spin interval a distance equal to the maximum displacement.

9. The method of claim 1 wherein the determining a maximum displacement step is characterized by selecting an outermost data storage track of the medium.

10. The method of claim 1 further comprising selecting a different data storage track of the medium for determining the maximum displacement.

11. A data storage device comprising:
a data transfer head;
a data storage medium; and
a control mechanism comprising programmed instructions for performing the method of claim 1 for a predetermined number of loading occurrences.

12. A data storage device comprising:
a data transfer head;
a data storage medium; and
a control mechanism comprising programmed instructions for performing the method of claim 1 in relation to observing a threshold data transfer error rate.

13. A servo controller apparatus configured for controlling a velocity for moving a head during a loading sequence in relation to a first input defining a maximum displacement during the loading sequence for the head from a parked position, and in relation to a second input defining a predetermined quantity of data storage medium rotation prior to the head being displaced a distance equal to the maximum displacement.

14. The apparatus of claim 13 wherein the quantity of data storage medium rotation is selected from a set consisting of an amount of time and a number of rotations.

15. The apparatus of claim 13 wherein the velocity control is selected from a set consisting of observing a BEMF voltage and a servo control seek profile.

16. The apparatus of claim 13 wherein the velocity control is characterized by a continuous nonzero velocity.

17. The apparatus of claim 13 wherein the velocity control is characterized by a continuous positive velocity.

18. The apparatus of claim 13 further responsive to a data transfer error rate in selecting a data storage track of the medium defining the maximum displacement.

19. The apparatus of claim 13 controlling a head loading sequence in a data storage device.

* * * * *